(12) United States Patent
Jiang

(10) Patent No.: US 8,052,776 B2
(45) Date of Patent: Nov. 8, 2011

(54) POLY(AMINO-ALCOHOL)-SILICA HYBRID COMPOSITIONS AND MEMBRANES

(75) Inventor: Dayue D. Jiang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 412 days.

(21) Appl. No.: 12/474,541

(22) Filed: May 29, 2009

(65) Prior Publication Data

US 2010/0300289 A1    Dec. 2, 2010

(51) Int. Cl.
*B01D 53/22* (2006.01)
*B01D 71/38* (2006.01)
*B01D 71/60* (2006.01)
*B01D 71/70* (2006.01)

(52) U.S. Cl. ............ 95/51; 95/45; 95/49; 96/4; 96/11; 96/12; 210/500.37; 210/500.42; 427/372.2; 427/384; 427/397.7

(58) Field of Classification Search ............ 95/45, 49, 95/51; 96/4, 11, 12, 13, 14; 210/500.27, 210/500.37, 500.42; 427/372.2, 384, 397.7; 502/4
See application file for complete search history.

(56) References Cited

U.S. PATENT DOCUMENTS

| | | | |
|---|---|---|---|
| 4,330,440 A | 5/1982 | Ayers et al. | 525/54.31 |
| 5,354,829 A * | 10/1994 | Swisher et al. | 528/10 |
| 5,611,843 A | 3/1997 | Ho | 95/51 |
| 5,770,275 A | 6/1998 | Raman et al. | 427/535 |
| 5,814,372 A * | 9/1998 | Moya | 427/245 |
| 5,935,646 A | 8/1999 | Raman et al. | 427/424 |
| 6,099,621 A | 8/2000 | Ho | 95/139 |
| 7,011,694 B1 | 3/2006 | Ho | 95/51 |
| 7,896,948 B2 * | 3/2011 | Deng et al. | 95/51 |
| 2004/0047799 A1 | 3/2004 | Randhava et al. | 423/652 |
| 2004/0109884 A1 | 6/2004 | Burmeister et al. | 424/423 |
| 2005/0211624 A1 * | 9/2005 | Vane et al. | 210/500.37 |
| 2007/0051680 A1 | 3/2007 | Vane et al. | 210/639 |
| 2008/0017827 A1 | 1/2008 | Ito et al. | |
| 2009/0110907 A1 * | 4/2009 | Jiang et al. | 428/315.9 |
| 2010/0270234 A1 * | 10/2010 | Liu et al. | 96/4 |

FOREIGN PATENT DOCUMENTS

| | | |
|---|---|---|
| JP | 08-073739 | 3/1996 |
| JP | 06-291089 | 10/2006 |
| WO | WO 89/07521 | 8/1989 |
| WO | WO 2006/050531 | 5/2006 |
| WO | WO 2007/084921 | 7/2007 |

OTHER PUBLICATIONS

T. Uragami, et al., "Structure and Permeation Characteristics of an Aqueous Ethanol Solution of Organic-Inorganic Hybrid Membranes Composed of Poly(vinyl alcohol) and Tetraethoxysilane", *Macromolecules*, 2002, vol. 35, p. 9156-9163.

(Continued)

*Primary Examiner* — Jason M Greene
(74) *Attorney, Agent, or Firm* — Susan S. Wilks

(57) ABSTRACT

The present invention provides a method for making a hybrid composition membrane comprising the steps of preparing a sol comprising at least one poly(amino-alcohol) and at least one alkoxy silane, casting the sol on a surface and drying the casted sol to form the hybrid composition membrane. The hybrid composition membrane may be used for capturing and separating $CO_2$ and/or $H_2S$ from a gas sample.

18 Claims, 2 Drawing Sheets

OTHER PUBLICATIONS

T.S. Chung, et al., "Mixed matrix membranes (MMMs) comprising organic polymers with dispersed inorganic fillers for gas separation", Prog. Polym. Sci., vol. 32, 2007, pp. 483-507.

M.Y. Kariduraganavar et al., "Pervaporation separation of water-acetic acid mixtures through poly(vinyl alcohol)-silicone based hybrid membranes", Journal of Membrane Science, vol. 246, 2005, pp. 83-93.

S.S. Kulkarni et al., "Synthesis and Characterization of Hybrid Membranes Using Poly(vinyl alcohol) and Tetraethylorthosilicate for the Pervaporation Separation of Water-Isopropanol Mixtures", Journal of Applied Polymer Science, vol. 94, 2004, pp. 1304-1315.

S.J. Lue, et al., "Polyurethane (PU) membrane preparation with and without hydroxypropyl-βcyclodextrin and their pervaporation characteristics", Journal of Membrane Science, vol. 222, 2003, pp. 203-217.

F. Peng, et al., "Hybrid Organic-Inorganic Membrane: Solving the Tradeoff between Permeability and Selectivity", Chem. Mater., vol. 17, 2005, pp. 6790-6796.

"UW Technologies Available for Licensing—Various Technologies: System and Methods for CO2 Selection and Separation", Wyoming Research Products Center, http://uwadmnweb.uwyo.edu/rpc/UWTechs/VariousCO2Technologies.asp.

* cited by examiner

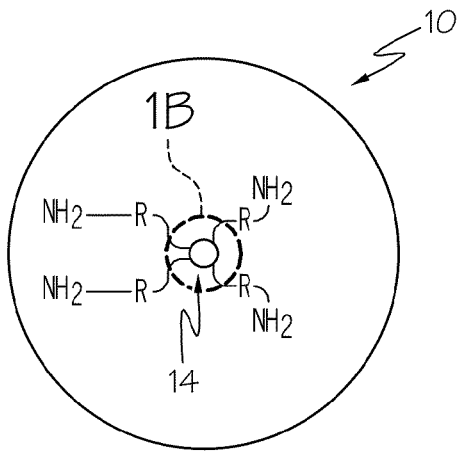
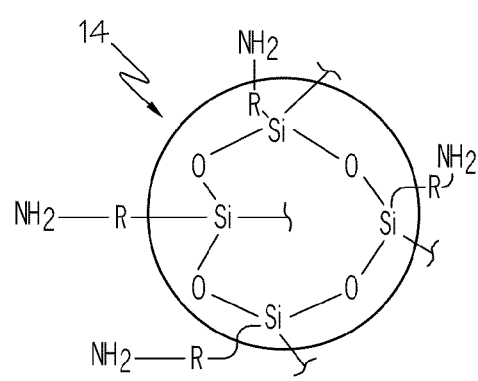
FIG. 1A
FIG. 1B
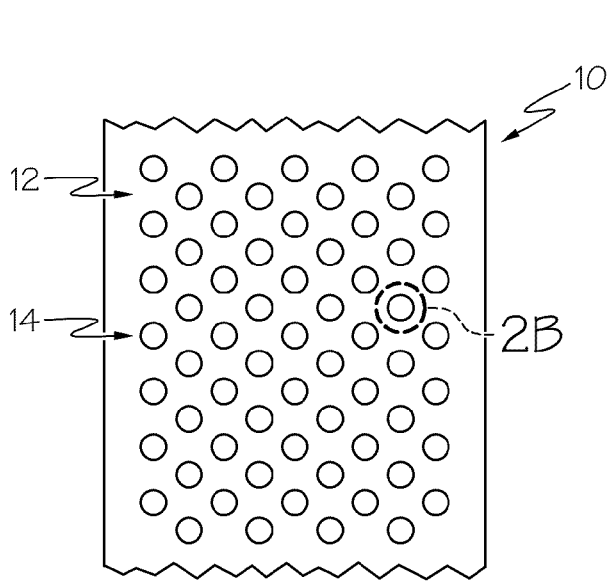
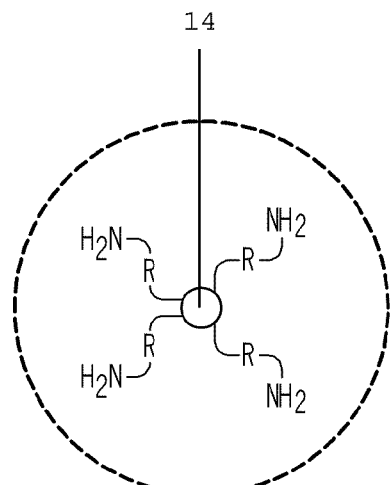
FIG. 2A
FIG. 2B

POLY(AMINO-ALCOHOL)-SILICA HYBRID COMPOSITIONS AND MEMBRANES

FIELD OF THE INVENTION

The present invention relates generally to organic-inorganic hybrid compositions and membranes comprising a poly (amino-alcohol) and a silylated compound, and particularly to sol-gel compositions and membranes formed from the composition comprising a poly(amino-alcohol) and an aminoalkyl alkoxysilane.

BACKGROUND

There are a number of industrial processes, such as coal gasification, biomass gasification, steam reforming of hydrocarbons, partial oxidation of natural gas, and like processes, which produce gas streams that include, for example, $CO_2$, $H_2$, and CO. It is frequently desirable to remove and capture $CO_2$ from those gas mixtures, for example, by sequestration to produce a $H_2$ or $H_2$ enriched gas product.

Therefore it would be desirable to have mechanisms or improved mechanisms to remove these gases from gas streams. Such a mechanism may include chemical separation processes, through amino chemistry, for example. It would be particularly desirable if such a mechanism effectively captures and separates $CO_2$. It would also be desirable to have an efficient and cost-effective process for making the mechanism while still taking advantage of amino group chemistry.

SUMMARY

One aspect of the invention is a method for making an organic-inorganic hybrid composition membrane comprising the steps of preparing a sol comprising at least one poly (amino-alcohol) and at least one aminoalkyl alkoxysilane, casting the sol onto a surface and drying the sol to form the organic-inorganic hybrid composition membrane. The poly (amino-alcohol) may act as the bulk phase as well as a functional phase of the membrane while the aminoalkyl alkoxysilane may be the precursor of the silica core of the membrane as well as a second functional phase.

In another aspect, the present invention includes a method for making an organic-inorganic hybrid composition membrane-coated support comprising the steps of preparing a sol comprising at least one poly(amino-alcohol) and at least one aminoalkyl alkoxysilane, depositing the sol on the support and drying the sol to form the organic-inorganic hybrid composition membrane-coated support.

In a further aspect, the present invention includes an organic-inorganic hybrid composition membrane where the membrane comprises at least one poly(amino-alcohol) and at least one poly(aminoalkyl siloxane). The poly(amino-alcohol) and the poly(aminoalkyl siloxane) may be crosslinked to each other. The membrane may further comprise a hydrophilic polymer, a low molecular weight amine, an oligomeric/polymer amine or combinations thereof. Also provided are supports coated with the organic-inorganic hybrid composition membrane.

In yet another aspect, the present invention includes a sol for making a organic-inorganic hybrid composition membrane where the sol comprises at least one poly(amino-alcohol) and at least one aminoalkyl alkoxysilane.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1A is an illustration showing the silica core of an organic-inorganic hybrid composition membrane;

FIG. 1B is an illustration showing the molecular structure of the silica core of the organic-inorganic hybrid composition membrane of FIG. 1A;

FIG. 2A is an illustration showing an organic-inorganic hybrid composition membrane;

FIG. 2B is an illustration showing the silica core of the organic-inorganic hybrid composition membrane of FIG. 2A.

DETAILED DESCRIPTION

Figure 3:
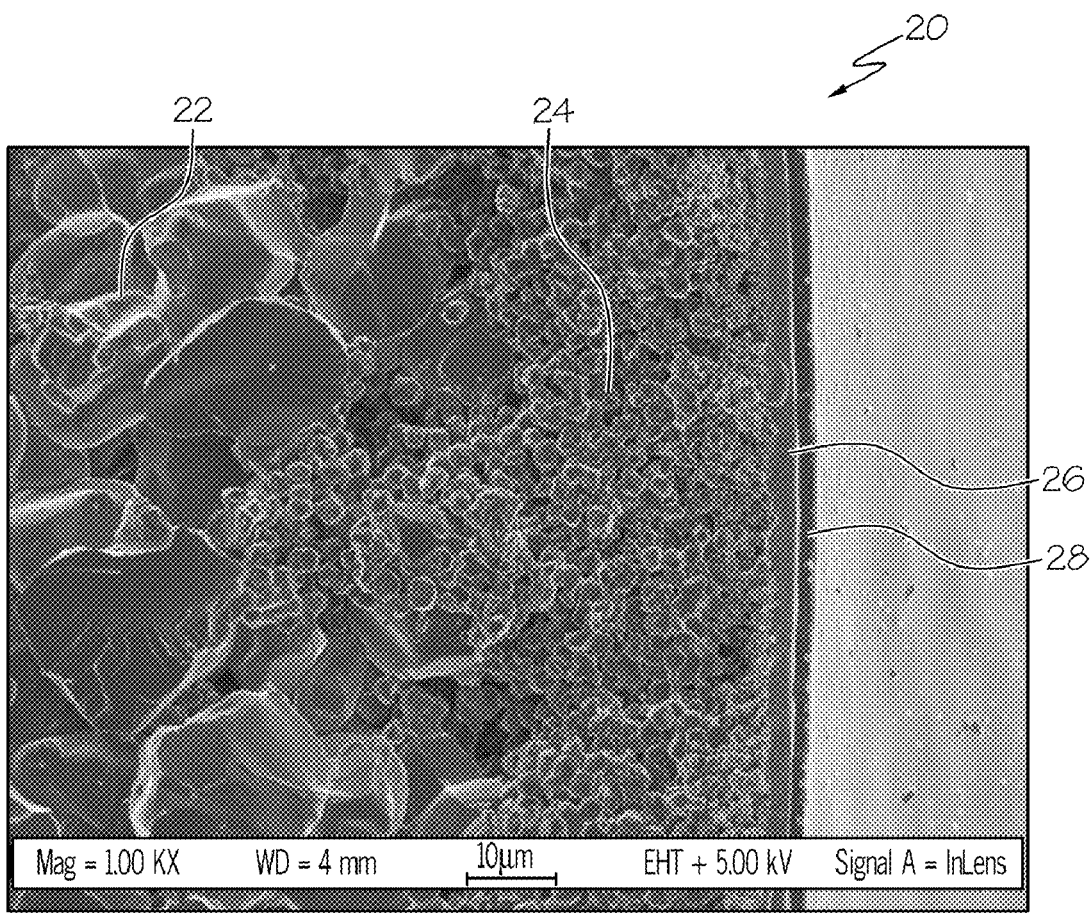
FIG. 3 is a scanning electric micrograph of an organic-inorganic hybrid composition-coated hybrid support.

Embodiments of the present invention are directed toward environmentally benign organic-inorganic hybrid sol compositions and organic-inorganic hybrid composition membranes as well as methods of making the same. In embodiments, the organic-inorganic hybrid membranes may have amino functionality, allowing them to be used to absorb gases such as $CO_2$, $H_2S$ and/or other acidic gases and remove them from a gas mixture. The organic-inorganic hybrid composition membrane may comprise a poly(amino-alcohol), such as, but not limited to, poly(vinyl alcohol-co-vinylamine) (PVAAm), which may function as the bulk phase and the functional phase of the membrane, and a poly(aminoalkyl siloxane) such as, but not limited to, poly(3-aminopropyl siloxane), which may function as the silica core formed through a sol-gel process and the second functional phase of the membrane because of the amino-groups.

There are a number of technologies currently used for removing $CO_2$, $H_2S$ and/or other acidic gases from gas mixtures. The most basic are amine-based gas scrubbers having an amino-alcohol such as monoethanolamine (MEA), and diethanolamine (DEA). In these scrubbers, the gas mixture is contacted with an amine-containing organic solvent or an amine-containing solution. $CO_2$ and other acidic molecules, such as $H_2S$, are selectively absorbed in the amine solution. The process takes advantage of the strong interaction between the amine, a base, and the $CO_2$, an acid, leading to formation of a carbamate salt.

However, there are drawbacks to this process such as high cost and inefficiencies. Membrane technology has therefore been developed and makes the gas separation process simpler. There are two kinds of commonly used membrane: inorganic and organic/polymeric. The inorganic membrane shows an excellent gas separation and can have both a high permeability and a high selectivity. However, large-scale applications of the inorganic membrane are still quite limited because of the poor processing ability and high cost. In contrast, the organic membranes, which are usually based on polymer(s), are cheap and easy to use, but there is often a trade-off between the permeability and the selectivity, i.e., the more permeable a membrane, the less selective, and vice versa.

Alternatively, hybrid membranes, referred to as mixed matrix membranes (MMM), may be used for $CO_2$ removal from gas mixtures, particularly in presence of amino functionality. Structurally, organic-inorganic hybrid membranes consist of an organic polymer, the bulk phase, and inorganic particles non-covalently dispersed within the organic polymer. Most MMMs are currently prepared by a process of dispersing the preformed inorganic particles in the membrane formulation. However, during membrane formation there can be uncontrolled agglomeration of the inorganic particles leading to formation of membranes with packing density variations of the molecules and microstructural inhomogeneities.

In contrast, embodiments of the organic-inorganic hybrid membranes of the present invention are formed from a poly (amino alcohol) and an aminoalkyl alkoxysilane. The result is an organic-inorganic hybrid composition membrane with uniform packing densities and microstructural homogeneity that is capable of effectively capturing and separating $CO_2$, $H_2S$ and/or other acidic gases from a mixture of gases. In embodiments, the aminoalkyl alkoxysilane may in situ form a silica core/particle through a sol-gel process and also provide a functional group for capturing $CO_2$ because of the amino moiety. In embodiments, the in situ formed silica core is homogenously dispersed throughout the membrane, providing additional functional groups for efficient capturing and separation of gases such as $CO_2$, $H_2S$ and/or other acidic gases. The methods of the present invention also provide an efficient and cost effective process for making the organic-inorganic hybrid composition membrane.

In embodiments, the method may include the steps of forming a sol comprising the polyamine and other hydrophilic polymers, casting the sol onto a surface and drying the sol to form the hybrid composition membrane. In embodiments, the method of the present invention, in contrast to prior art methods, does not involve dispersing an inorganic particle into the hybrid composition, thus avoiding agglomeration of the inorganic particles. The sol may be deposited onto a support to provide a hybrid composition membrane-coated support which is capable of molecular separation of gases such as $CO_2$, $H_2S$ and/or other acidic gases from gas streams.

In embodiments of the invention there is provided a method for making an organic-inorganic hybrid composition membrane. The method may comprise the steps of preparing a sol having at least one poly(amino-alcohol) and at least one aminoalkyl alkoxysilane in an aqueous solvent, casting the sol onto a surface and drying the sol to form the organic-inorganic hybrid composition membrane. The poly(amino-alcohol) may function both as the bulk phase of the membrane as well as the functional polymer where the amino moieties bind or absorb the $CO_2$, $H_2S$ and/or other acidic gases. The aminoalkyl alkoxysilane may function as the precursor for a silica core formed through a sol-gel reaction as well as a second functional compound since it also comprises amino moieties.

The sol-gel process is a wet-chemical technique well known in the art. It begins with a chemical solution or suspension, the "sol," which acts as a precursor for an integrated network, or "gel" of network polymers. The sol has the monomeric units (i.e. the aminoalkyl alkoxysilane of the present invention) and may also have other desired components (i.e. the poly(amino-alcohol) of the present invention) of the final gel either in solution or as a suspension of submicron particles. The sol-gel process is a dynamic process where polycondensation begins in the sol and proceeds to a gel point. At the gel point, the polymerization is so extensive that it cannot be poured. The sol is cast or deposited before the gel point and polycondensation continues to the gel point after the sol is cast or deposited, particularly as it begins to dry and the sol becomes concentrated. Polycondensation may continue past the gel point, creating a stiffer gel.

In embodiments of the present invention, a sol is prepared by adding the aminoalkyl alkoxysilane to an aqueous solvent along with a poly(amino-alcohol). The aminoalkyl alkoxysilane undergoes hydrolysis where at least one of the alkoxy moieties is hydrolyzed to a hydroxyl moiety. The hydroxyl moiety can then react with either another hydroxyl moiety or an alkoxy moiety in a second aminoalkyl alkoxysilane through the sol-gel process, a polycondensation reaction. A silica particle/core 14 is formed as the reaction continues (see FIGS. 1A and 1B). The silica core 14 may exist as individual particles or with a networked structure or combination thereof and be uniformly dispersed in the final organic-inorganic hybrid composition membrane 10. The amino-moiety on the formed silica particles provides one more functional group for capturing the $CO_2$.

In one aspect of the present invention, the poly(amino-alcohol) may be, but is not limited to, poly(vinyl alcohol-co-vinylamine) (PVAAm), poly(vinyl alcohol-co-allylamine) (PVAAAm), poly(aminopropyl methacrylamide-co-hydroxyethyl methacrylate) (PAPMaHEMa) or combinations thereof. In embodiments, the poly(amino-alcohol) may be linear, branched, cyclic or dendrimeric. The amine moiety may comprise from about 1 mol % to about 60 mol % or higher. In an illustrative embodiment, the poly(amino-alcohol) may be poly(vinyl alcohol-co-vinyl amine) (PVAAm). The sol may comprise from about 5 wt % to about 40 wt % of the poly(amino-alcohol). Other amino-functionalized polymers including polyamines will also be applicable in additional embodiments.

In another aspect of the present invention, the aminoalkyl alkoxysilane may be, but is not limited to, 3-aminopropyltriethyoxysilane (APTEOS), aminoethylaminopropyltrimethoxysilane (AEAPTMOS), (3-trimethoxysilylpropyl)diethylenetriamine, 2-(trimethoxysilylethyl)pyridine, N-(trimethoxysilylethyl)benzyl-N,N-dimethylamine, N-(trimethoxysilylpropyl)isothiouronium chloride or combinations thereof. The aminoalkyl moiety of the aminoalkyl alkoxysilane may have any number of amino groups. While the length of alkyl chain of the aminoalkyl moiety is not critical, in exemplary embodiments the alkyl chain may have a length of from about 8 carbons to about 18 carbons and may be linear, branched or cyclic. The sol may comprise from about 5 wt % to about 40 wt % of the aminoalkyl alkoxysilane.

It is well known in making sol solutions that the concentration of each substituent may be such that the sol may transition to the gel before being cast or deposited on a support. The working time for a sol will depend on the substituents being used as well as concentration and temperature. Those skilled in that art will be able to determine the best concentration and other conditions for forming a gel from a sol without undue experimentation.

Likewise, the choice of aqueous solvent may be dependent on the substituents comprising the sol. By way of non-limiting example, PVAAm and APTEOS may be soluble in water. The aqueous solvent may be chosen based on the solubility characteristics of the desired poly(amino-alcohols) and aminoalkyl alkoxysilanes. Other examples of aqueous solvents may be short alkyl chain alcohols such as methanol and ethanol, either alone or in combination with water.

In embodiments, the sol can be cast onto a surface to form a film (e.g., by dip-coating or spin-coating), into a suitable container with the desired shape (e.g., to obtain monolithic ceramics, glasses, fibers, membranes, aerogels), or used to synthesize powders, microspheres, or nanospheres. Although the present invention is described as a membrane, the organic-inorganic hybrid composition of the present invention may be cast into a mold to produce objects of a desired shape or used to synthesize powders. In one embodiment of the present invention the sol is cast onto a support to produce an organic-inorganic hybrid composition membrane-coated support. The support may be, but not limited to, a ceramic honeycomb or other desired shape. The material and shape of the support will depend on the use of the final product. Some applications may require a small and simple support whereas other applications, i.e. diesel engines or commercial preparation of gases, may require larger, more complex supports such as ceramic honeycomb supports. Ceramic honeycombs are well known in the art and may be made of cordierite, mullite, aluminum titanate or aluminum. It will be appreciated that the shape and composition of the support may be of any material and shape desired by the skilled artisan.

Once the sol is cast on the desired surface and/or support, the sol and/or subsequent resulting gel may be dried removing the remaining liquid (solvent). As described above, the sol-gel process is a dynamic process and drying the sol may hasten the onset of the gel point. The drying process may be accompanied by a significant amount of shrinkage and densification. The rate at which the solvent can be removed is ultimately determined by the distribution of porosity in the gel. The ultimate microsupport of the final component will clearly be strongly influenced by changes imposed upon the structural template during this phase of processing. In one embodiment of the present invention, the casted sol is dried at room temperature for at least 6 hours or from about 6 hours to about 21 days to form the organic-inorganic hybrid composition membrane. In an additional embodiment, the casted or deposited sol is further dried at at least 50° C., and in an exemplary embodiment, from about 50° C. to about 70° C. for at least 2 hours. FIG. 2A illustrates the organic-inorganic hybrid composition membrane 10 showing the polymer phase 12 and the silica core 14. FIG. 2B shows an expanded view of the silica core 14 shown in FIG. 2A.

In embodiments, the organic-inorganic hybrid composition membrane has a poly(aminoalkyl siloxane) and a poly(amino-alcohol), where the poly(aminoalkyl siloxane), in presence as form of a silica core, is interdispersed among the poly(amino-alcohol). In exemplary embodiments, the poly(aminoalkyl siloxane) may be, but is not limited to, poly((3-siloxane propyl)diethylenetriamine), poly(2-(siloxane ethyl) pyridine), poly(N-(siloxane ethyl)benzyl-N,N-dimethylamine), poly(N-(siloxane propyl)isothiouronium chloride) or combinations thereof.

In embodiments, the poly(amino-alcohol) and the poly(aminoalkyl siloxane) may be optionally crosslinked in the organic-inorganic hybrid composition membrane. While a non-crosslinked hybrid composition membrane may be used to separate the $CO_2$-containing gases that do not contain water and/or other solvents that can dissolve the hybrid composition membrane, more particularly the poly(amino-alcohol), a crosslinked hybrid composition membrane may be desired to separate the $CO_2$-containing gases that contain water and/or other solvents that can dissolve the poly(amino-alcohol) component of the membrane.

To achieve a crosslinked support, the poly(aminoalkyl siloxane) may be crosslinked to the poly(amino-alcohol) through moieties other than the siloxane, i.e. through the alkyl, alcohol or amino moieties. The crosslinking may be achieved chemically, by radiation or a UV, or thermally. In an illustrative embodiment, a simple thermal process, such as heating the membrane at 150-200° C. for 3-5 minutes, can result in the crosslinking of PVAAm to the aminoalkyl silica core. The crosslinking may be done either in the sol, the gel, or the membrane. It will appreciated that the crosslinking may be more efficient in the gel or the membrane when the poly(amino-alcohol) and poly(aminoalkyl siloxane) are in close proximity to one another. It will also be appreciated that there may also be intramolecular crosslinking between the poly(amino-alcohol) or the poly(aminoalkyl siloxane) as well as intermolecular crosslinking.

In an alternative embodiment, a chemical crosslinking agent may be used. Non-limiting examples of crosslinking agents may be a polycarboxylic acid, such as 1,2,3,4-butane-tetracarboxylic acid, BTCA, or a carbodiimide, such as Carbodilite V-02. Both of these crosslinking agents are environmentally benign and will react with amino- and alcohol-moieties at a suitable temperature, as known to those in the art. Other examples of crosslinking agents may be an aldehyde or a dialdehyde, such as glutaraldehyde, and a diisocyanate. As the poly(aminoalkyl siloxane) contains multi amino-groups, some amino-groups may remain un-reacted, particularly with a well-controlled crosslinking density, and thus may available for $CO_2$ absorption. The crosslinking of the organic-inorganic hybrid composition membrane may also prevent the migration of the poly(aminoalkyl siloxane) because of the more highly structured networked.

In another embodiment, the sol may comprise at least one low molecular weight amine, an oligomeric/polymeric amine or combinations thereof Non-limiting examples of low molecular weight amines may be tetraethylenepentamine, ethylenediamine, or combinations thereof and non-limiting examples of an oligomeric/polymeric amine may be polyvinylamine, polyallylamine or combinations thereof The addition of the low molecular weight or oligomeric/polymeric amine may increase the capacity of the hybrid composition membrane to capture and separate $CO_2$, $H_2S$ and/or other acidic gases.

The present invention also provides a method for using the organic-inorganic hybrid composition membrane-coated support of the present invention to capture and separate $CO_2$, $H_2S$ and/or other acidic gases from a gas sample/stream. The method may comprise the step of flowing a gas through and/or over the organic-inorganic hybrid composition membrane-coated support. The $CO_2$, $H_2S$ and/or other acidic gases may be bound to the amine groups through hydrogen bonding and a weak ionic attraction. The method may further comprise the step of releasing the $CO_2$, $H_2S$ and/or other acidic gases from the organic-inorganic hybrid composition membrane-coated support. Methods are known in the art including, but not limited to, applying a charge to the hybrid composition-coated support, interfering with the charge attraction. It may be desirable to capture and separate $CO_2$, $H_2S$ and/or other acidic gases in order to purify a gas. Alternatively, $CO_2$, $H_2S$ and/or other acidic gases may be separated and collected for other uses. For example, $CO_2$ is a major product in producing bio-ethanol. The $CO_2$ is captured and isolated and subsequently used for example, to carbonate beverages or to make dry ice.

EXAMPLES

The invention will be further clarified by the following examples.

Example 1

Preparation of a PVAAm Sol and Membrane

A 1000 ml flask was charged was 549.0 g deionized water and put into an 85° C. hot glycol bath. A mechanical stirrer was installed and set to stir at 300 rpm. The flask was then charged 51.0 g polyvinyl alcohol-co-vinylamine (PVAAm) resin (Erkol L12, Celanese). The stirring speed was gradually increased to 600 rpm and maintained for 2 hours. The flask was removed from the hot bath and the solution filtered by passing it through a paper towel in order to remove the insoluble residue. The filtered solution was cooled to room temperature, either for preparing the PVAAm/APTEOS (3-aminopropyltriethyloxysilane) hybrid membrane solution or for obtaining a pure PVAAm coating/membrane by casting the cooled solution onto a glass support and drying at room temperature in a hood for 6 hours and then at 60° C. for 2 hours.

The PVAAm has an excellent property of membrane formation. An 8% aqueous solution of the PVAAm formed a clear coating on the glass support.

Example 2

Preparation of an APTEOS Sol and Membrane

A 20 ml vial was charged with 8.5 g deionized water and 1.5 g APTEOS was added drop-wise into the water with stirring. It should be noted that although the APTEOS aqueous solution used in the example was 15 wt %, any concentration solution may be used. A clear solution was obtained and an exothermal phenomenon was observed. The solution was subsequently used either for making the hybrid membrane solution of PVAAm/APTEOS or for obtaining an aminoalkyl silica coating/membrane by casting the solution onto glass support and drying at room temperature in a hood for 6 hours and then at 60° C. for 2 hours.

The aqueous solution of the APTEOS formed a smooth and transparent coating, after drying, on the glass support. In contrast, the bulk APTEOS, which is a liquid, did not form a good coating on the glass support, often producing a white powder that did not adhere to the support.

Example 3

Preparation of PVAAm/APTEOS Sol and Membrane

PVAAm and APTEOS have a good compatibility. Presented is a PVAAm/APTEOS aqueous solution with a ratio of PVAAm:APTEOS at 5:1. A 20 ml vial was charged with 6.25 g of the 8.0% PVAAm aqueous solution prepared in Example 1 and 0.67 g of the 15% APTEOS aqueous solution prepared in Example 2. The combined solutions were mixed well with shaking/stirring. The solution was clear and remained clear in storage. It was used for obtaining a PVAAm/silica coating/membrane by casting the solution onto a glass support and drying at room temperature in a hood for 6 hours and then at 60° C. for 2 hours. An alternative method was directly and slowly adding 0.2 g bulk APTEOS into 12.5 g 8.0% PVAAm aqueous solution with stirring to achieve the PVAAm/APTEOS aqueous solution and then casting the membrane.

Example 4

Coating PVAAm/APTEOS Hybrid Composition onto Ceramic Monolith

The ceramic monolith support used in the example was made of alpha-alumina with an outer diameter of about 9.7 mm and with 19, 0.8-mm rounded channels being uniformly distributed over the cross-sectional area. It had a mean pore size of about 10 μm and porosity of about 45% and was modified with two coating layers of alpha-alumina and then a layer of gamma-alumina on the channel surface. The mass of the dried ceramic monolith was measured and then wrapped with Teflon tape and the mass was measured again. On one end of the ceramic monolith a pseudo vacuum system (syringe) was connected. Then the other end of the ceramic monolith was soaked into the PVAAm/APTEOS aqueous solution obtained in Example 3 while withdrawing the syringe. After the solution was drawn into the syringe for 10 seconds, the solution was pushed out and the ceramic monolith connected to an $N_2$ source to remove the extra solution from the channels of the ceramic monolith. The coated ceramic monolith was dried at room temperature overnight and subsequently placed in a dryer, which is preheated to 80° C., for 4 hours. After cooling to room temperature, the mass was measured to obtain the weight gain.

FIG. 3 shows a scanning electromicrograph (SEM) image of the hybrid composition-coated support 20 with a porous ceramic monolith 22, a coating layer of alpha-alumina 24, a coating layer of gamma-alumina 26 and the hybrid composition membrane 28. The hybrid composition membrane 28 has a uniform density with no obvious voids.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

Example 5

$CO_2$ Capture Test

The $CO_2$ capture capacity of the aminoalkyl silica core derived from APTEOS was evaluated using a qualitative $CO_2$ capture test. A ~15 wt % solution of APTEOS in aqueous system (sol) was prepared. The solution was applied to glass wool filter paper as the support and then dried overnight at room temperature followed by 100° C. for 15 minutes. The weight of the filter paper was measured before and after the solution was applied. Based on the weight gain (difference), about 60 wt % of the APTEOS was attached to the glass wool filter paper.

The resulting APTEOS-glass wool filter paper was evaluated for its ability to absorb $CO_2$. The APTEOS-glass wool filter paper was placed in a humidified $CO_2$ atmosphere for about 30 minutes and then in water. Next, a few drops of $Ba(OH)_2$ saturated solution was added to the water. The APTEOS-glass wool filter paper was gently stirred for 15 minutes, resulting in a cloudy appearance due to the formation of finely dispersed insoluble $BaCO_3$. When a control APTEOS-glass wool filter paper that was not exposed to the humidified $CO_2$ atmosphere was also evaluated with the $Ba(OH)_2$, a light cloudy appearance was also observed because of the silica core formed during the sample preparation. However, the cloudy appearance of the control was significantly less than the sample exposed to the humidified $CO_2$ atmosphere.

Alternatively, the glass wool filter paper was dried overnight after the $CO_2$ capture test. The ~60% APTEOS attached glass wool filter paper, by mass difference, has a weight gain at ~4%, after CO2 capture test and dried at room temperature for over night.

Both the $Ba^{2+}$ test and the weight gain confirm that the APTEOS has a capability of capture the CO2. Combining with the property of forming a silica core, the APTEOS can therefore be used as a component of an organic-inorganic hybrid membrane for $CO_2$ separation.

What is claimed is:

1. A method for making an organic-inorganic hybrid composition membrane comprising the steps of:
    preparing a sol comprising at least one poly(amino-alcohol), at least one aminoalkyl alkoxysilane;
    casting the sol onto a surface; and
    drying the sol to form the organic-inorganic hybrid composition membrane.

2. The method of claim 1 wherein the poly(amino-alcohol) is poly(vinyl alcohol-co-vinyl amine).

3. The method of claim 1 wherein the sol comprises from about 5 wt % to about 40 wt % of the poly(amino-alcohol).

4. The method of claim 1 wherein the aminoalkyl alkoxysilane is 3-aminopropyltriethyoxysilane, aminoethylaminopropyltrimethoxysilane, (3-trimethoxysilylpropyl)diethylenetriamine, 2-(trimethoxysilylethyl)pyridine, N-(trimethoxysilylethyl)benzyl-N,N-dimethylamine, N-(trimethoxysilylpropyl)isothiouronium chloride or combinations thereof.

5. The method of claim 1 wherein the sol comprises from about 5 wt % to about 40 wt % of the aminoalkyl alkoxysilane.

6. The method of claim 1 wherein the sol further comprises at least one low molecular weight or oligomeric/polymeric amine.

7. The method of claim 1 wherein the poly(amino-alcohol) and the aminoalkyl alkoxysilane are crosslinked.

8. An organic-inorganic hybrid composition membrane made by the method of claim 1.

9. The method of claim 1 wherein the surface is a porous ceramic support.

10. An organic-inorganic hybrid composition membrane-coated support made by the method of claim 9.

11. A method for capturing or separating carbon dioxide or hydrogen sulfide from a gas comprising flowing the gas over or through the organic-inorganic hybrid composition membrane-coated support of claim 10.

12. An organic-inorganic hybrid composition membrane comprising at least one poly(amino-alcohol) and at least one poly(aminoalkyl siloxane).

13. The organic-inorganic hybrid composition membrane of claim 12 wherein the poly(amino-alcohol) is poly(vinyl alcohol-co-vinyl amine).

14. The organic-inorganic hybrid composition membrane of claim 12 wherein the poly(aminoalkyl siloxane) is poly(3-aminopropylsiloxane), poly(aminoethylaminopropylsiloxane), poly((3-siloxane propyl)diethylenetriamine), poly(2-(siloxane ethyl)pyridine), poly(N-(siloxane ethyl)benzyl-N,N-dimethylamine), poly(N-(siloxane propyl)isothiouronium chloride) or combinations thereof.

15. The organic-inorganic hybrid composition membrane of claim 12 wherein the membrane further comprises at least one low molecular weight or oligomeric/polymer amine.

16. The organic-inorganic hybrid composition membrane of claim 12 wherein the poly(amino-alcohol) and the poly(aminoalkyl siloxane) are crosslinked.

17. The organic-inorganic hybrid composition membrane of claim 16 wherein the poly(amino-alcohol) and the poly(aminoalkyl siloxane) are crosslinked chemically, by radiation, thermally or a combination thereof.

18. A hybrid composition membrane-coated support comprising a porous ceramic support coated with the organic-inorganic hybrid composition membrane of claim 12.

* * * * *